(12) United States Patent
Kelly, III et al.

(10) Patent No.: US 9,086,915 B2
(45) Date of Patent: Jul. 21, 2015

(54) TELEMATICS CONTROL UTILIZING RELATIONAL FORMULAS

(71) Applicant: General Motors LLC, Detroit, MI (US)

(72) Inventors: James J. Kelly, III, Ferndale, MI (US); Ryan M. Edwards, Macomb, MI (US)

(73) Assignee: General Motors LLC, Detroit, MI (US)

( * ) Notice: Subject to any disclaimer, the term of this patent is extended or adjusted under 35 U.S.C. 154(b) by 268 days.

(21) Appl. No.: 13/739,190

(22) Filed: Jan. 11, 2013

(65) Prior Publication Data

US 2014/0201748 A1 Jul. 17, 2014

(51) Int. Cl.
G06F 9/46 (2006.01)
G06F 9/48 (2006.01)

(52) U.S. Cl.
CPC .................. G06F 9/4843 (2013.01)

(58) Field of Classification Search
CPC .................................................. G06F 9/4843
See application file for complete search history.

(56) References Cited

U.S. PATENT DOCUMENTS

| | | | |
|---|---|---|---|
| 6,704,564 B1 * | 3/2004 | Lange et al. | 455/412.1 |
| 7,286,047 B2 * | 10/2007 | Oesterling et al. | 340/439 |
| 7,788,281 B2 * | 8/2010 | Cole et al. | 707/792 |
| 8,301,330 B2 * | 10/2012 | Nielsen | 701/29.1 |
| 8,336,664 B2 * | 12/2012 | Wallace et al. | 180/271 |
| 8,433,471 B2 * | 4/2013 | Christensen et al. | 701/29.1 |
| 8,787,949 B2 * | 7/2014 | Sumcad et al. | 455/466 |
| 2005/0080606 A1 * | 4/2005 | Ampunan et al. | 703/8 |
| 2005/0216583 A1 * | 9/2005 | Cole et al. | 709/224 |
| 2007/0191995 A1 * | 8/2007 | Laghrari | 701/1 |
| 2008/0039995 A1 * | 2/2008 | Reeser | 701/30 |
| 2009/0017811 A1 * | 1/2009 | Cole et al. | 455/418 |
| 2011/0069680 A1 * | 3/2011 | Krause et al. | 370/332 |
| 2012/0006610 A1 * | 1/2012 | Wallace et al. | 180/272 |
| 2014/0085113 A1 * | 3/2014 | Bonhoure et al. | 340/932.2 |

* cited by examiner

*Primary Examiner* — Van Nguyen
(74) *Attorney, Agent, or Firm* — Leydig, Voit & Mayer, Ltd.

(57) ABSTRACT

A telematics unit is provided. The telematics unit includes a non-transitory computer-readable medium and a processor, configured to execute a telematics task manager application according to processor-executable instructions stored on the non-transitory computer-readable medium. The telematics task manager application comprises a plurality of tasks. Each task includes one or more subtasks. Each subtask including subtask-specific triggering logic for execution of one or more actions based on the triggering logic. The triggering logic is based on modular condition blocks.

16 Claims, 7 Drawing Sheets

TELEMATICS CONTROL UTILIZING RELATIONAL FORMULAS

FIELD

The present disclosure relates generally to telematics systems and more particularly to control of telematics units by utilizing modular condition blocks and Boolean relational formulas.

BACKGROUND

Telematics units within mobile vehicles provide subscribers with connectivity to a telematics service provider (TSP). The TSP provides subscribers with an array of services ranging from emergency call handling and stolen vehicle recovery to diagnostics monitoring, global navigation system aided position identification, map services, and turn-by-turn navigation assistance. Telematics units are often provisioned and activated at a point of sale when a subscriber purchases a telematics-equipped vehicle. Upon activation, the telematics unit can be utilized to provide a subscriber with telematics services such as those described herein.

As vehicle diagnostic and control systems become increasingly complex, more and more advanced functionality may be provided to users by utilizing various vehicle sensors and control modules. However, the control logic of conventional telematics may not be able to adapt to quickly take advantage of such advancements in technology, and updating telematics units can be a costly and cumbersome process.

The above body of information is provided for the convenience of the reader. The foregoing describes a suitable environment for which the described system and method are provided, and is not an attempt to review or catalog the prior art.

SUMMARY

A system and method are described herein for providing a platform which utilizes a plurality of modular condition blocks according to Boolean logic formulas to provide complex, yet flexible and easily configurable, control of telematics units.

In an implementation, a telematics unit is provided. The telematics unit includes a non-transitory computer-readable medium and a processor, configured to execute a telematics task manager application according to processor-executable instructions stored on the non-transitory computer-readable medium. The telematics task manager application comprises a plurality of tasks. Each task includes one or more subtasks. Each subtask including subtask-specific triggering logic for execution of one or more actions based on the triggering logic. The triggering logic is based on modular condition blocks.

In a further implementation a method is provided for a processor-implemented method for controlling operation of a telematics unit is provided. The method includes: determining, by a telematics task manager application executed by a processor of the telematics unit, that subtask-specific triggering logic indicates that one or more actions is to be performed, wherein the determination further comprises determining that a Boolean relational formula utilizing modular condition blocks evaluates to TRUE; and performing the one or more actions.

In yet another further implementation, the above-described method is implemented as processor-executable instructions stored on a tangible, non-transitory computer-readable medium that is part of a telematics unit.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Before discussing the details of the invention and the environment wherein the invention may be used, a brief overview is given to guide the reader. In general terms, not intended to limit the claims, a system and method are described herein for providing a platform which utilizes a plurality of modular condition blocks according to Boolean logic formulas to provide complex, yet flexible and easily configurable control of telematics units. The platform separates triggering logic from constituent modular condition blocks to allow a nearly limitless set of possible logical configurations, as well as to facilitate future expansion of the control logic to accommodate new constituent modular condition blocks and new triggering logic formulas.

Figure 1:
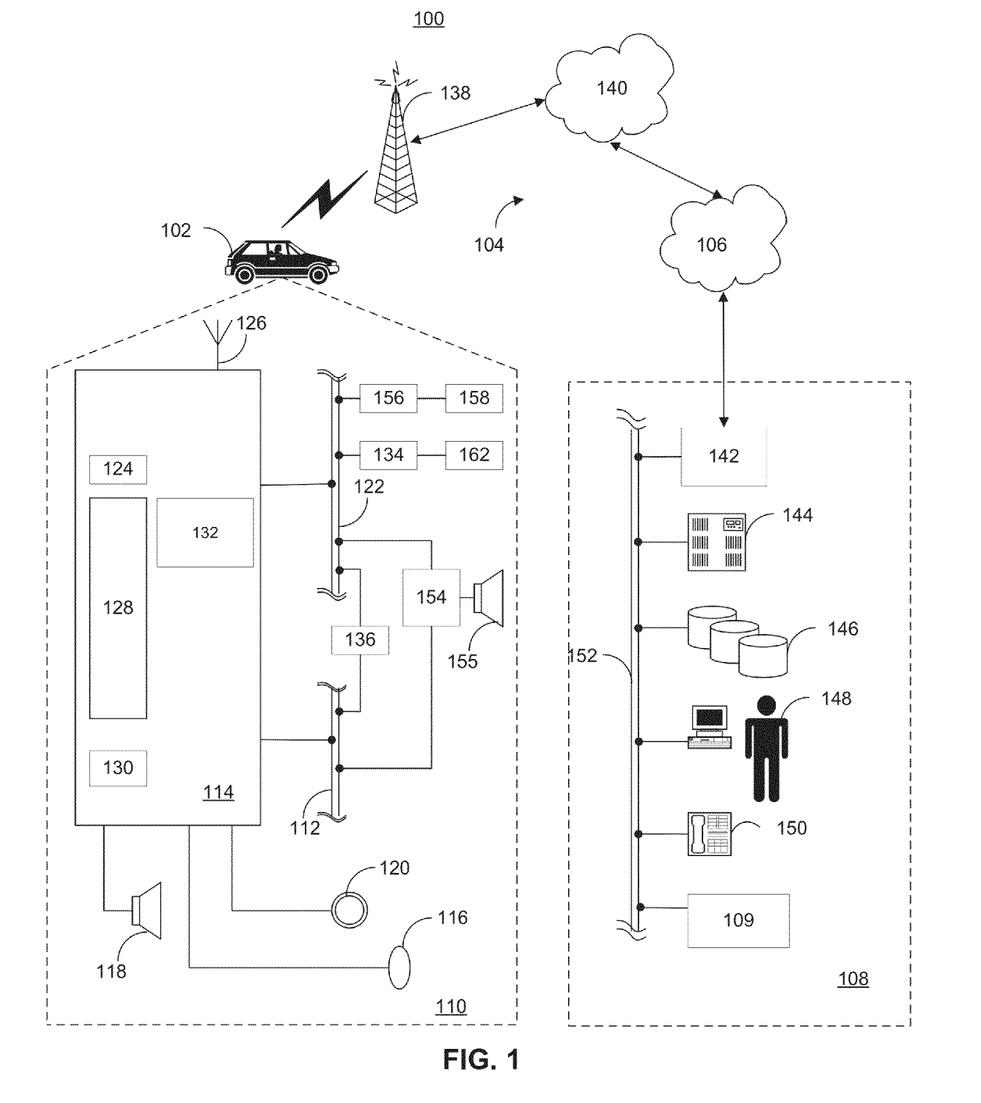
FIG. 1 is a schematic diagram of an operating environment for a mobile vehicle communication system usable in implementations of the described principles.

An exemplary computing and network communications environment is described hereinafter. It will be appreciated that the described environment is an example, and does not imply any limitation regarding the use of other environments to practice the invention. With reference to FIG. 1 there is shown an example of a communication system 100 that may be used with the present method and system and generally includes a vehicle 102, a mobile wireless network system 104, a land network 106 and a communications center 108. It should be appreciated that the overall architecture, setup and operation, as well as the individual components of the communication system 100 is generally known in the art. In accordance with an illustrative example, the communication center 108 includes a GNSS control center 109 incorporating functional components facilitating over-the-air configuration of GNSS receivers integrated with/within telematics units such as a telematics unit 114. Thus, the following paragraphs provide a brief overview of an exemplary communication system 100. However, other systems are contemplated that are capable of incorporating the described GNSS receiver and GNSS control center functionality described herein.

The vehicle 102 is, for example, a motorcycle, a car, a truck, a recreational vehicle (RV), a boat, a plane, etc. The vehicle 102 is equipped with suitable hardware and software that configures/adapts the vehicle 102 to facilitate communications with the communications center 108 via mobile wireless communications. The vehicle 102 includes hardware 110 such as, for example, the telematics unit 114, a microphone 116, a speaker 118 and buttons and/or controls 120 integrated with the telematics unit 114.

The telematics unit 114 is communicatively coupled, via a hard wire connection and/or a wireless connection, to a vehicle bus 122 for supporting communications between electronic components within the vehicle 102. Examples of suitable network technologies for implementing the vehicle bus 122 in-vehicle network include a controller area network (CAN), a media oriented system transfer (MOST), a local interconnection network (LIN), an Ethernet, and other appropriate connections such as those that conform with known ISO, SAE, and IEEE standards and specifications.

The telematics unit 114 provides a variety of services through communications with the communications center 108. The telematics unit 114 includes an electronic processor 128, electronic memory 130, a mobile wireless component 124 including a mobile wireless chipset, a dual function antenna 126 (both GNSS and mobile wireless signal), and a GNSS component 132 including a GNSS chipset. In one example, the mobile wireless component 124 comprises an electronic memory storing a computer program and/or set of computer-executable instruction sets/routines that are transferred to, and executed by, the processing device 128. The mobile wireless component 124 constitutes a network access device (NAD) component of the telematics unit 114.

The telematics unit 114 provides, for users, an extensive/extensible set of services. Examples of such services include: GNSS-based mapping/location identification, turn-by-turn directions and other navigation-related services provided in conjunction with the GNSS component 132; and airbag deployment notification and other emergency or roadside assistance-related services provided in connection with various crash and or collision sensor interface modules 156 and crash sensors 158 located throughout the vehicle.

GNSS navigation services are, for example, implemented based on the geographic position information of the vehicle provided by the GNSS component 132. A user of the telematics unit 114 enters a destination, for example, using inputs associated with the GNSS component 132, and a route to a destination may be calculated based on the destination address and a current position of the vehicle determined at approximately the time of route calculation. Turn-by-turn (TBT) directions may further be provided on a display screen corresponding to the GNSS component and/or through vocal directions provided through a vehicle audio component 154. It will be appreciated that the calculation-related processing may occur at the telematics unit or may occur at a communications center 108.

The telematics unit 114 also supports infotainment-related services whereby music, Web pages, movies, television programs, video games and/or other content is downloaded by an infotainment center 136 operatively connected to the telematics unit 114 via the vehicle bus 122 and an audio bus 112. In one example, downloaded content is stored for current or later playback.

The above-listed services are by no means an exhaustive list of the current and potential capabilities of the telematics unit 114, as should be appreciated by those skilled in the art. The above examples are merely a small subset of the services that the telematics unit 114 is capable of offering to users. Moreover, the telematics unit 114 includes a number of known components in addition to those listed above that have been excluded since they are not necessary to understanding the functionality discussed herein below.

Vehicle communications use radio transmissions to establish a communications channel with the mobile wireless network system 104 so that both voice and data signals can be sent and received via the communications channel. The mobile wireless component 124 enables both voice and data communications via the mobile wireless network system 104. The mobile wireless component 124 applies encoding and/or modulation functions to convert voice and/or digital data into a signal transmitted via the dual function antenna 126. Any suitable encoding or modulation technique that provides an acceptable data rate and bit error can be used. The dual function antenna 126 handles signals for both the mobile wireless component 124 and the GNSS component.

The microphone 116 provides the driver or other vehicle occupant with a means for inputting verbal or other auditory commands, and can be equipped with an embedded voice processing unit utilizing a human/machine interface (HMI) technology known in the art. The speaker 118 provides verbal output to the vehicle occupants and can be either a standalone speaker specifically dedicated for use with the telematics unit 114 or can be part of an audio component 154. In either case, the microphone 116 and the speaker 118 enable the hardware 110 and the communications center 108 to communicate with occupants of the vehicle 102 through audible speech.

The hardware 110 also includes the buttons and/or controls 120 for enabling a vehicle occupant to activate or engage one or more components of the hardware 110 within the vehicle 102. For example, one of the buttons and/or controls 120 can be an electronic push button used to initiate voice communication with the communications center 108 (whether it be live advisors 148 or an automated call response system). In another example, one of the buttons and/or controls 120 initiates/activates emergency services supported/facilitated by the telematics unit 114.

The audio component 154 is operatively connected to the vehicle bus 122 and the audio bus 112. The audio component 154 receives analog information via the audio bus, and renders the received analog information as sound. The audio component 154 receives digital information via the vehicle bus 122. The audio component 154 provides AM and FM radio, CD, DVD, and multimedia functionality independent of the infotainment center 136. The audio component 154 may contain a speaker system 155, or may utilize the speaker 118 via arbitration on the vehicle bus 122 and/or the audio bus 112.

The vehicle crash and/or collision detection sensor interface 156 is operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

A set of vehicle sensors 162, connected to various ones of a set of sensor interface modules 134 are operatively connected to the vehicle bus 122. Examples of the vehicle sensors 162 include but are not limited to gyroscopes, accelerometers, magnetometers, emission detection and/or control sensors, and the like. Examples of the sensor interface modules 134 include ones for power train control, climate control, and body control.

The mobile wireless network system 104 is, for example, a cellular telephone network system or any other suitable wireless system that transmits signals between mobile wireless devices, such as the telematics unit 114 of the vehicle 102, and land networks, such as the land network 106. In the illustrative example, the mobile wireless network system 104 includes a set of cell towers 138, as well as base stations and/or mobile switching centers (MSCs) 140, as well as other networking components facilitating/supporting communications between the mobile wireless network system 104 with the land network 106. For example, the MSC 140 includes a remote data server.

As appreciated by those skilled in the art, the mobile wireless network system includes various cell tower/base station/MSC arrangements. For example, abuse station and a cell tower could be co-located at the same site or they could be remotely located, and a single base station could be coupled to various cell towers or various base stations could be coupled with a single MSC, to name but a few of the possible arrangements.

Land network 106 can be, for example, a conventional land-based telecommunications network connected to one or more landline end node devices (e.g., telephones) and connects the mobile wireless network system 104 to the communications center 108. For example, land network 106 includes a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or ne works providing broadband wireless access (BWA), or any combination thereof.

The communications center 108 is configured to provide a variety of back-end services and application functionality to the hardware 110. The communications center 108 includes, by way of example, network switches 142, servers 144, databases 146, live advisors 148, as well as a variety of other telecommunications equipment 150 (including modems and computer/communications equipment known to those skilled in the art. These various call center components are, for example, coupled to one another via a network link 152 (e.g., a physical local area network bus and/or a wireless local network, etc.). Switch 142, which can be a private branch exchange (PBX) switch, routes incoming signals so that voice transmissions are, in general, sent to either the live advisors 148 or an automated response system, and data transmissions are passed on to a modem or other component of the telecommunications equipment 150 for processing (e.g., demodulation and further signal processing).

The telecommunications equipment 150 includes, for example, an encoder, and can be communicatively connected to various devices such as the servers 144 and the databases 146. For example, the databases 146 comprise computer hardware and stored programs configured to store subscriber profile records, subscriber behavioral patterns, and other pertinent subscriber information. Although the illustrated example has been described as it would be used in conjunction with a manned version of the communications center 108, it will be appreciated that the communications center 108 can be any of a variety of suitable central or remote facilities, which are manned/unmanned and mobile/fixed facilities, to or from which it is desirable to exchange voice and data.

It will be appreciated by those of skill in the art that the execution of the various machine-implemented processes and steps described herein may occur via the computerized execution of computer-executable instructions stored on a tangible computer-readable medium, e.g., RAM, ROM, PROM, volatile, nonvolatile, or other electronic memory mechanism. Thus, for example, the operations performed by the telematics unit may be carried out according to stored instructions or applications installed on the telematics unit, and operations performed at the call center may be carried out according to stored instructions or applications installed at the call center.

According to an exemplary implementation, the telematics unit includes a telematics task manager application for controlling operation of the telematics unit. The telematics task manager application includes a collection of independently executing tasks, which may further include subtasks and a task storage buffer for storing data relevant to the task. With further reference to the architecture of FIG. 1, and turning more specifically to FIG. 2, an example of an independently executing task 200 of the task manager is depicted. The task 200 includes subtasks S1, S2, S3, and S4, and a task storage buffer 201. Each subtask is a logical routine that includes triggering logic based on modular condition blocks, where if certain conditions are met, one or more actions are performed.

Figure 2:
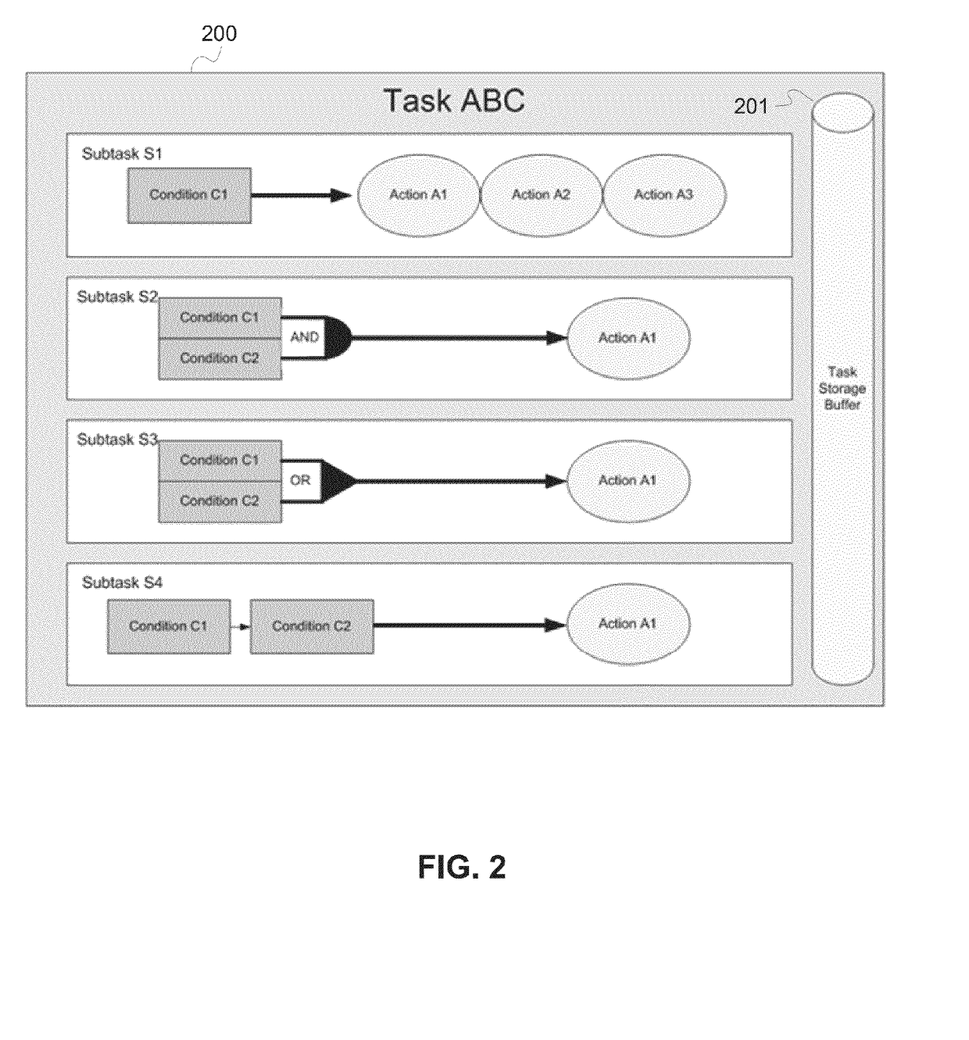
FIG. 2 is a diagram depicting subtasks and a task storage buffer corresponding to an exemplary Task ABC according to an exemplary implementation of the described principles.

Specifically, with respect to the exemplary subtasks shown in FIG. 2, subtask S1 includes the triggering logic that if the condition corresponding to modular condition block C1 is met, actions A1, A2, and A3 are executed. Subtask S2 includes the triggering logic that if both the conditions corresponding to modular condition blocks C1 and C2 are met, action A1 is executed. Subtask S3 includes the triggering logic that if either or both of the conditions corresponding to modular condition blocks C1 or C2 are met, action A1 is executed. Subtask S4 includes the triggering logic that if first a determination that the condition corresponding to modular condition block C1 is met is followed by a determination that the condition corresponding to modular condition block C2 is met, action A1 is executed. With respect to subtask S4, the condition corresponding to modular condition block C2 is not evaluated until it is determined that the condition corresponding to modular condition block C1 is met. The task storage buffer 201 is used to store any data that may need to be stored during execution of the tasks A1, A2, or A3.

In an implementation, each task of the telematics task manager application includes a unique task ID and can support up to eight subtasks. Components of an exemplary task are shown below in Table 1.

TABLE I

Task Components

| Component | Description | Value Range |
| --- | --- | --- |
| TaskID | An enumeration used to differentiate Tasks from one another. | 1-254 |
| TPN (Task Priority Number) | Used to determine Task execution order. Lower TPNs are executed first. | |
| Task-Enabled Flag | If FALSE, Task shall not be executed. If TRUE, Task can be executed. | Boolean |
| Subtask(s) | Definition of subtasks that are part of the task (e.g., Task 200 in FIG. 2 includes subtasks S1, S2, S3, and S4) | N/A |
| Task Storage Buffer | Storage of data related to execution of Task. | N/A |

The components of the task shown above in Table I are configurable for each different Task. TaskIDs are unique and used to differentiate Tasks from one another, TPNs are used to determine the order in which Tasks are executed. A Task-Enabled Flag is used to determine if the Task is to be executed at all. Further, each Task includes subtask(s) and a task storage buffer as discussed above.

It will be appreciated that the triggering logic shown in subtasks S1, S2, S3, and S4 corresponds to Boolean relational formulas, Subtask S1 depicts the situation where the Boolean relational formula is simply C1—i.e., if condition C1 evaluates to TRUE, the triggering logic for subtask S1 evaluates to TRUE. Subtask S2 depicts the situation where the Boolean relational formula is C1 AND C2 i.e., if conditions C1 and C2 both evaluate to TRUE, the triggering logic for subtask S2 evaluates to TRUE. Subtask S3 depicts the situation where the Boolean relational formula is C1 OR C2 i.e., if either or both of conditions C1 and/or C2 evaluate to TRUE, the triggering logic for subtask S3 evaluates to TRUE, Subtask S4 depicts the situation where the Boolean relational formula is C1 THEN C2 i.e., condition C2 is not evaluated until condition C1 evaluates to TRUE, and if conditions C2 and C1 both evaluate to TRUE, the triggering logic for subtask S4 evaluates to TRUE.

Figure 3:
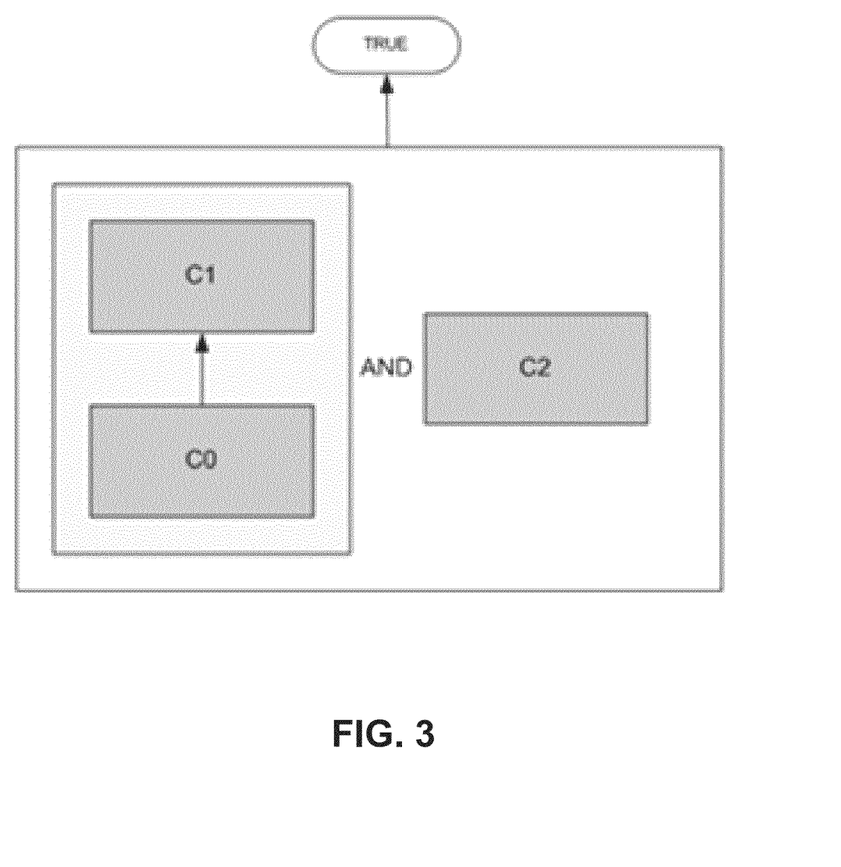
FIGS. 3-7 are Boolean flowcharts depicting exemplary Boolean relational formulas utilizing modular condition blocks according to exemplary implementations of the described principles.
Figure 4:
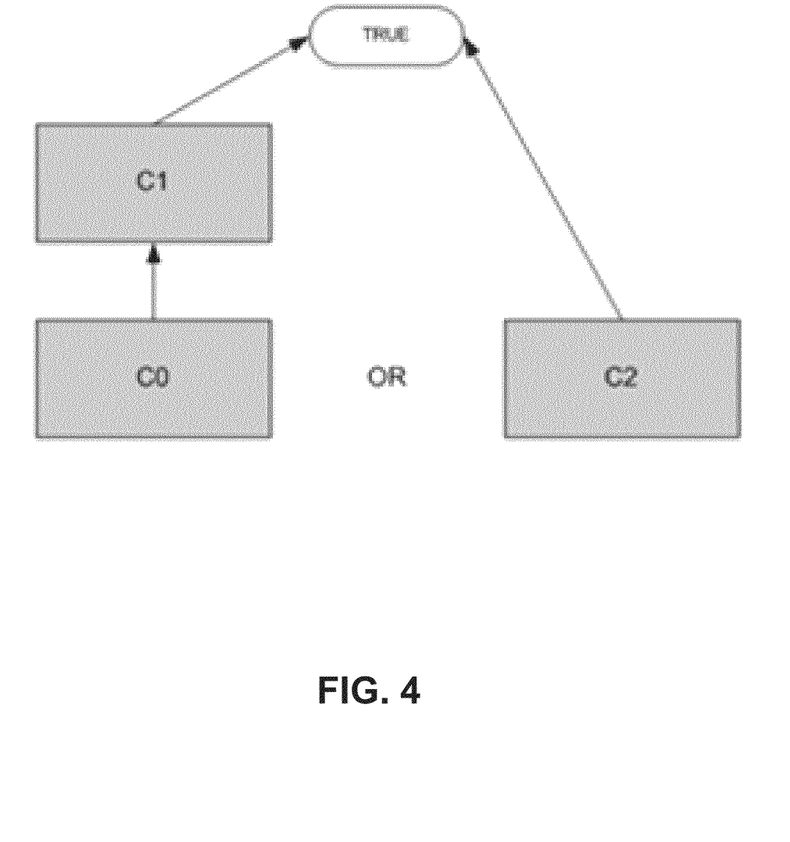
Figure 5:
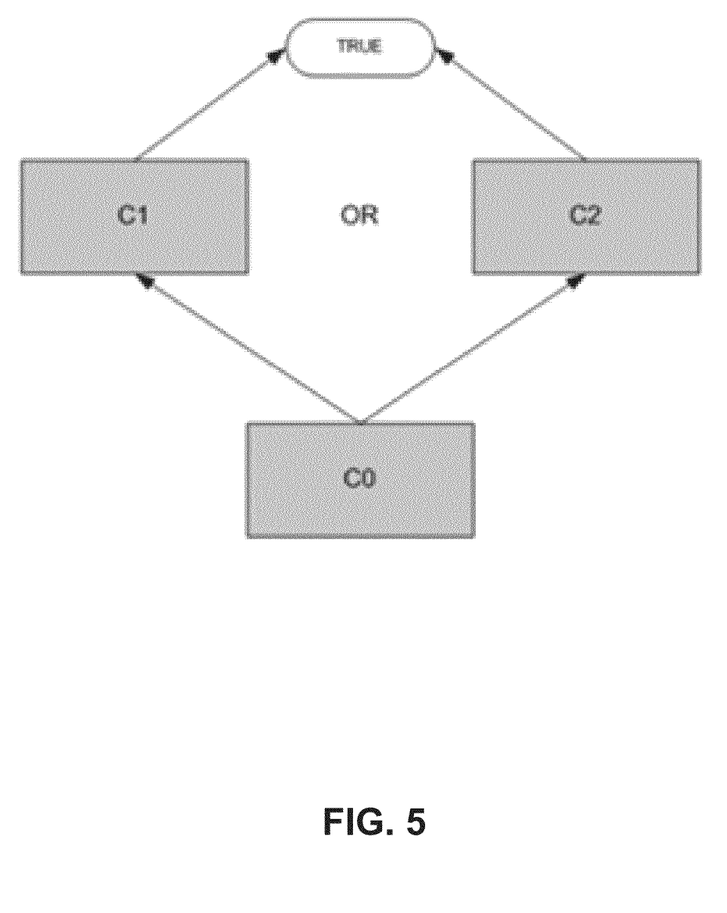
Figure 6:
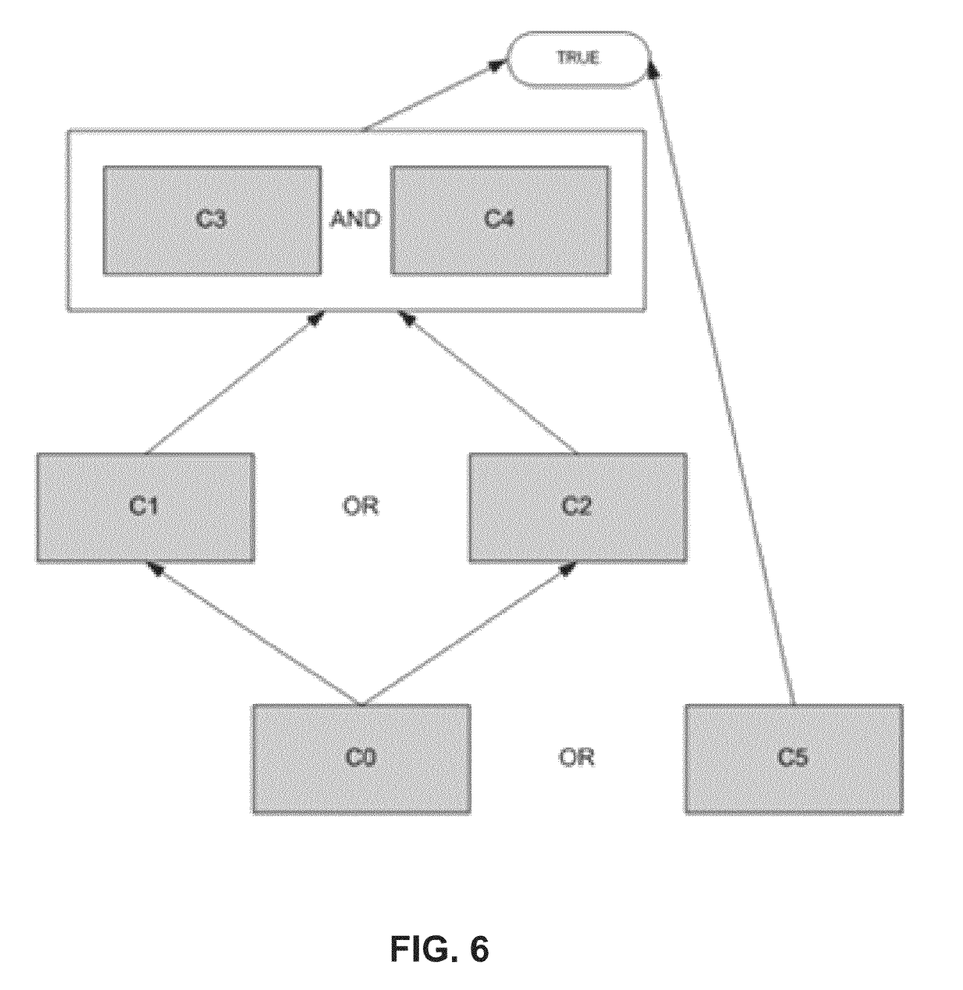
Figure 7:
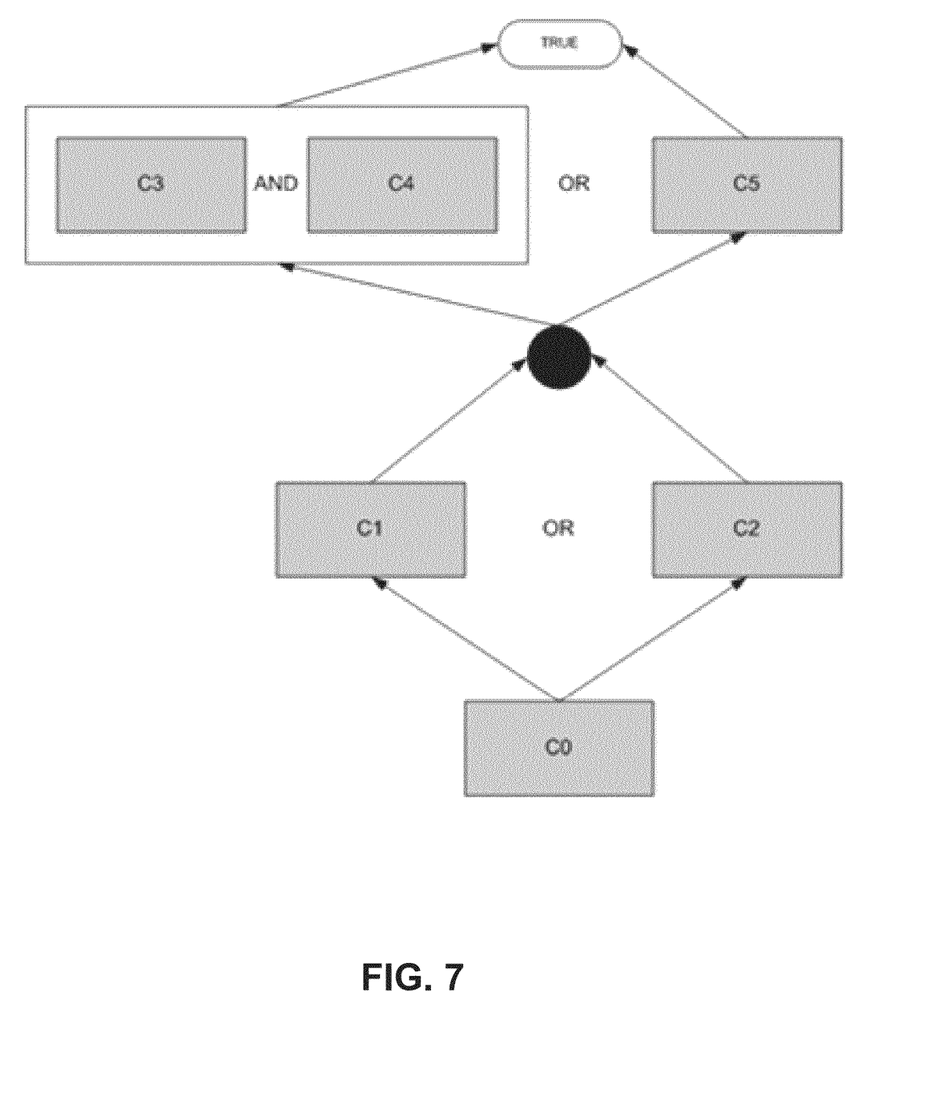

It will be appreciated that more complex Boolean relational formulas may also be used that combine the Boolean operators discussed above with respect to subtasks S1-S4, as well as using other Boolean relations such as NOT (i.e., a Boolean relational formula NOT C1 would evaluate to TRUE when condition C1 evaluates to FALSE). FIGS. 3 through 7 depict exemplary triggering logic routines that involve Boolean relational formulas utilizing more than one Boolean operator. FIG. 3 depicts the example of triggering logic corresponding to C0 THEN C1 AND C2. FIG. 4 depicts the example of (C0 THEN C1) OR C2. FIG. 5 depicts the example of C0 THEN (C1 OR C2). FIG. 6 depicts the example of C0 THEN (C1 OR C2) THEN (C3 AND C4) OR C5. FIG. 7 depicts the example of C0 THEN (C1 OR C2) THEN ((C3 AND C4) OR C5). It will be appreciated that for FIGS. 3 through 7, if the Boolean flowchart corresponding to the triggering logic does not reach the TRUE condition, the triggering logic would evaluate to FALSE.

Examples of particular implementations of the above-described Boolean logic include:

"when a powertrain DTC XYZ goes current AND the SES telltale illuminates OR when powertrain DTC ABC goes current . . . " (could correspond to a Boolean relational formula of the structure C0 AND C1 OR C2);

"every 10 minutes of ignition run after every $5^{th}$ ignition cycle . . . " (could correspond to a Boolean relational formula of the structure C0 THEN C1);

"when a vehicle crosses a geoboundary on a weekend . . . " (could correspond to a Boolean relational formula of the structure C0, or could also correspond to a Boolean relational formula of the structure C0 AND C1); and "if ignition is RUN and the day is Monday-Friday and hours are between 6 AM and 10 AM or 4 PM and 6 PM . . . " (could correspond to a Boolean relational formula of the structure C0 AND C1 AND (C2 OR C3)).

Thus, by providing triggering logic that utilizes modular condition blocks, the described system and method allows for complex, yet flexible and easily configurable control of a telematics unit to adapt to a variety of different conditions and combinations thereof. However, it will be appreciated that the foregoing methods and implementations are merely examples of the inventive principles, and that these illustrate only preferred techniques.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements all possible variations thereof is encompassed by the invention unless otherwise indicated herein or otherwise clearly contradicted by context.

The invention claimed is:

1. A telematics unit of a telematics-equipped vehicle, comprising:
   a non-transitory computer-readable medium;
   a processor, configured to execute a telematics task manager application according to processor-executable instructions stored on the non-transitory computer-readable medium;
   wherein the telematics task manager application comprises a plurality of tasks and a plurality of modular condition blocks, wherein each task includes one or more subtasks, each subtask includes subtask-specific triggering logic for execution of one or more actions based on the triggering logic, and the triggering logic is based on the plurality of modular condition blocks;
   wherein the telematics task manager application is configured to communicate with vehicle sensors and control modules of the telematics-equipped vehicle to determine whether sensed conditions of the telematics-equipped vehicle corresponding to the plurality of modular condition blocks are met, wherein the conditions include conditions relating to:
   a powertrain status, and
   an ignition status, and
   wherein a sensed condition of the telematics-equipped vehicle relating to the powertrain status corresponds to a diagnostic trouble code (DTC), and wherein a sensed condition of the telematics-equipped vehicle relating to the ignition status corresponds to whether the vehicle ignition is being run.

2. The telematics unit of claim 1, wherein each task further includes a task storage buffer.

3. The telematics unit of claim 1, wherein the processor is configured to execute the one or more actions if the triggering logic evaluates to TRUE based on a Boolean relational formula utilizing the modular condition blocks.

4. The telematics unit of claim 3, wherein the Boolean relational formula defines a relationship between the modular condition blocks using at least one of an AND, THEN, OR, or NOT operator.

5. The telematics unit of claim 4, wherein the Boolean relational formula defines the relationship between the modular condition blocks using a combination of at least two of the AND, THEN, OR, or NOT operators.

6. The telematics unit of claim 1, wherein at least one of the modular condition blocks is used in more than one subtask.

7. A non-transitory computer-readable medium, part of a telematics unit of a telematics-equipped vehicle, having processor-executable instructions thereon for controlling operation of the telematics unit, the processor-executable instructions, when executed by a processor, causing the following steps to be performed:
   communicating, by a telematics task manager application of the telematics unit, with vehicle sensors and control modules of the telematics-equipped vehicle to determine whether sensed conditions of the telematics-equipped vehicle corresponding to a plurality of modular condition blocks are met, wherein the conditions include conditions relating to:
      a powertrain status, and
      an ignition status;
   determining, by the telematics task manager application, that subtask-specific triggering logic indicates that one or more actions is to be performed, wherein the determination further comprises determining that a Boolean relational formula utilizing modular condition blocks of the plurality of modular condition blocks evaluates to TRUE; and
   performing the one or more actions,
   wherein a sensed condition of the telematics-equipped vehicle relating to the powertrain status corresponds to a diagnostic trouble code (DTC), and wherein a sensed condition of the telematics-equipped vehicle relating to the ignition status corresponds to whether the vehicle ignition is being run.

8. The non-transitory computer-readable medium of claim 7, wherein the processor-executable instructions further cause the following step to be performed: storing, by the telematics task manager application, task-related data to a task storage buffer.

9. The non-transitory computer-readable medium of claim 7, wherein the Boolean relational formula defines a relationship between the modular condition blocks using at least one of an AND, THEN, OR, or NOT operator.

10. The non-transitory computer-readable medium of claim 9, wherein the Boolean relational formula defines the relationship between the modular condition blocks using a combination of at least two of the AND, THEN, OR, or NOT operators.

11. The non-transitory computer-readable medium of claim 7, wherein at least one of the modular condition blocks is used in more than one subtask.

12. A processor-implemented method for controlling operation of a telematics unit of a telematics-equipped vehicle, the method comprising:
   communicating, by a telematics task manager application of the telematics unit, with vehicle sensors and control modules of the telematics-equipped vehicle to determine whether sensed conditions of the telematics-equipped vehicle corresponding to a plurality of modular condition blocks are met, wherein the conditions include conditions relating to:
      a powertrain status, and
      an ignition status;
   determining, by the telematics task manager application executed by a processor of the telematics unit, that subtask-specific triggering logic indicates that one or more actions is to be performed, wherein the determination further comprises determining that a Boolean relational formula utilizing modular condition blocks of the plurality of modular condition blocks evaluates to TRUE; and
   performing the one or more actions,
   wherein a sensed condition of the telematics-equipped vehicle relating to the powertrain status corresponds to a diagnostic trouble code (DTC), and wherein a sensed condition of the telematics-equipped vehicle relating to the ignition status corresponds to whether the vehicle ignition is being run.

13. The method of claim 12, further comprising:
   storing, by the telematics task manager application, task-related data to a task storage buffer.

14. The method of claim 12, wherein the Boolean relational formula defines a relationship between the modular condition blocks using at least one of an AND, THEN, OR, or NOT operator.

15. The method of claim 14, wherein the Boolean relational formula defines the relationship between the modular condition blocks using a combination of at least two of the AND, THEN, OR, or NOT operators.

16. The method of claim 12, wherein at least one of the modular condition blocks is used in more than one subtask.

* * * * *